T. J. Knapp,
Hollow Auger.

N° 12,864. Patented May 15, 1855.

UNITED STATES PATENT OFFICE.

THOMAS J. KNAPP, OF PHILADELPHIA, PENNSYLVANIA.

ADJUSTABLE TENONING-TOOL.

Specification of Letters Patent No. 12,864, dated May 15, 1855.

*To all whom it may concern:*

Be it known that I, THOMAS J. KNAPP, of the city and county of Philadelphia and State of Pennsylvania, have invented a new and Improved Tool for Cutting Round Tenons on the Spokes of Wheels; and I do hereby declare that the following is a full, clear, and exact description of the same, reference being had to the annexed drawings, making a part of this specification, in which—

Figure 2:
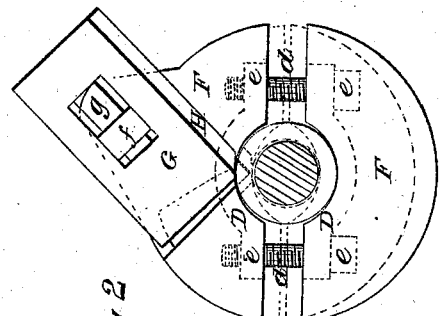
Figure 1:
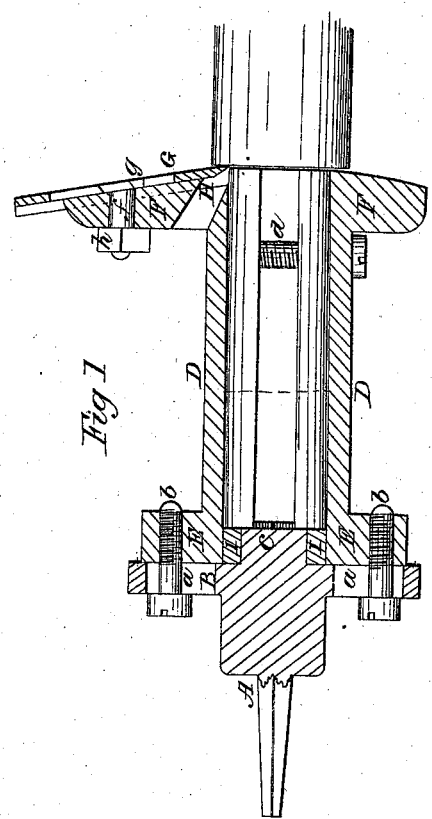
Figure 3:
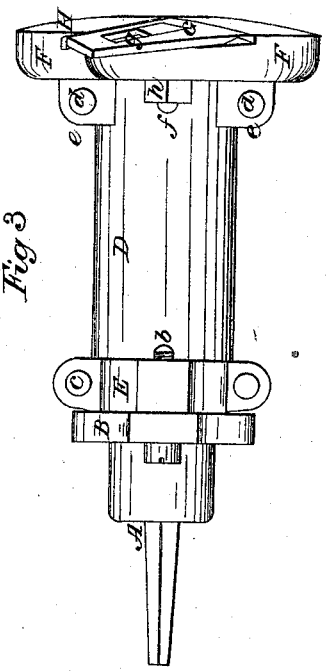

Figure 1 is a longitudinal section of the tool, the plane of section being through the center. Fig. 2 is a face view of the same. Fig. 3 is a side view of the same.

Similar letters of reference indicate corresponding parts in the several figures.

This invention relates to a new and improved tool for cutting round tenons on the ends of wheel spokes, and consists in the peculiar construction of the tool, as will be hereafter fully shown and described, whereby the tool may be adjusted so as to cut tenons of larger or smaller diameter, as required.

To enable others skilled in the art to fully understand and construct my invention, I will proceed to describe it.

A, (Figs. 1, and 2,) represents the shank of the tool, which is fitted in the end of a rotating spindle or mandrel. The outer end of the shank is provided with a flanch, B, having oblong slots, ($a$, $a$,) through it, and a hub or boss, C, at the center of its face side, see Fig. 1.

D, D, are two segments of a cylinder or tube, having flanches, E, at one end, through which screws, ($b$) pass, said screws, ($b$) also passing through the slots, ($a$, $a$) in the flanch B, (see Fig. 1). The flanches, E, of the two segments have screws, ($c$) passing through them, and screws, ($d$) pass through projections ($e$) at the oposite ends of the segments, see Fig. 2. The same screws passing through the flanches and projections of both segments. The outer ends of the segments are provided with flanches F, F, which form the face of the tool. To one of the flanches, F, there is secured a cutter, G, of chisel shape, said cutter is secured to the flanch by a screw ($f$) which passes through a slot ($g$) in the cutter, and into the flanch, and having a nut ($h$) on its end at the inner side of the flanch, see Figs. 1 and 3. The head of the screw, ($f$) has a countersunk or beveled head, and the slides of the slot ($g$) are also beveled, so that the head of the screw may be flush with the outer surface of the cutter, see Fig. 3.

Adjoining the cutter, G, there is a small bit or cutter, H, the cutting edge of which is placed at a right angle with the cutting edge of the cutter, G. Around the hub or boss, C, there is placed a ring, I, see Fig. 1, the diameter of which corresponds to that of the tenons to be cut.

Operation: A ring, I, is placed around the hub or boss, C, the diameter of which ring, corresponds with the diameter of the tenons to be cut. The two segments are then adjusted by operating the screws, ($b$, $c$, $d$,) the inner ends of the segments, resting against the periphery of the ring, I, thus leaving the bore or the aperture between the segments of a size equal to the diameters of the tenons to be cut. The cutter, G, being placed obliquely upon the face or flanch, F, of the tool, one end of its cutting edge only acts upon the spoke, while the whole surface of the cutting edge of the bit, or cutter, H, acts upon the spoke. The shank, A, is placed in a rotating mandrel or spindle and the end of the spoke pressed into the bore or aperture formed by the two segments, the bit, or cutter, H, cutting the tenon, and the cutter, G, forms the shoulder at the inner end of the tenon.

By the above invention, tenons of larger or smaller diameters may be cut with the same tool, by merely using various sized rings, I, corresponding with the diameters of the tenons to be cut, and adjusting the segments so that the bore, or aperture, between them, corresponds in size to the ring used.

I do not claim the cutters, G, H, for they have been previously used, but

What I claim as new and desire to secure by Letters Patent is,

The construction of the tool as herein shown and described; viz having two segments, D, D, of a cylinder secured to the flanch, B, of the shank, A, by screws ($b$, $b$) and having screws ($c$, $c$) ($d$, $d$) pass through the flanches, E, E, and projections (*e, e*) of both segments, for the purpose of allowing the segments to be placed nearer together or farther apart as desired, and having a hub or boss, C, at the center of the face of the flanch, B, to receive rings, I, of different sizes, corresponding to the diameter of the tenons to be cut, and by which rings the segments are properly adjusted the required distance apart for the purpose of cutting tenons of various sizes, as herein shown and described.

THOMAS J. KNAPP.

Witnesses:
PETER CASTOR,
JOHN H. WATSON.